3,093,692
PREPARATION OF CYCLOHEXENE FLUORIDE-1
George N. Valkanas, Athens, Greece, and Heinrich Hopff, Zurich, Switzerland, assignors to Stauffer Chemical Company, a corporation of Delaware
No Drawing. Filed Dec. 29, 1960, Ser. No. 79,128
1 Claim. (Cl. 260—648)

This invention relates to a process for making 1,1-difluorocyclohexane, 1-fluoro 1-chloro cyclohexane and cyclohexene fluoride-1.

The success of some of the perfluorinated plastics has caused an increased interest in plastics which contain fluorine in place of the usual hydrogen because the increase in bond strength brings about an increase in stability of the plastic. The present invention relates to plastic intermediates of the cyclohexene and cyclohexane series which materials contain fluorine and which can be easily oxidized to the corresponding ketones to produce a suitable plastic raw material. Further, the cyclohexene fluoride produced in accordance with the present invention is a vinyl compound subject to polymerization.

As starting materials for carrying out the synthesis of the present invention, cyclohexene, 1,1-dichlorocyclohexane or cyclohexene chloride or mixtures thereof are suitable. These materials can be made in the known way by the reaction of cyclohexanone with phosphorus pentachloride which yields a mixture of cyclohexane chloride and 1,1-dichlorocyclohexane. The mixture so produced can be used as a raw material, as is hereinafter demonstrated, for the purpose of carrying out the synthesis of the present invention or the mixture can be purified to separate the starting materials.

Both the 1,1-difluorocyclohexane and the 1-fluoro 1-chloro cyclohexane are uncolored liquids of pleasant smell and are very stable compounds. They are only slightly decomposed by heating for over 10 hours in a 2 N sodium hydroxide alcoholic solution. The 1-fluoro 1-chloro cyclohexane is slightly less stable toward alkaline hydrolysis although it is not hydrolyzable in solvents such as ethanol and aqueous ethanol.

The following non-limiting examples illustrate preferred embodiments of the present invention.

*Example I*

A mixture (78 g.) of cyclohexene chloride-1 and 1,1-dichlorocyclohexane was produced by reacting cyclohexanone with phosphorous pentachloride. This mixture was added dropwise to 200 cc. of dry hydrogen fluoride at 0° C. with stirring. The reaction vessel used was made of polyethylene. After all of the mixture had been added, stirring was continued for 1 hour at the same temperature. The excess of hydrogen fluoride was then distilled off with a copper distillation apparatus and the residue was poured over ice, neutralized with a sodium carbonate solution then extracted with ether and dried. The product was then fractionated and a fraction was obtained having a boiling point of 100–1° C. at 730 mm. of an uncolored liquid. The yield of said liquid was 35.2 g. or 48% yield. A fluorine analysis confirmed the product to be substantially pure 1,1-difluorocyclohexane. The higher boiling materials produced consisted mainly of 1-fluoro 1-chloro cyclohexane.

*Example II*

Cyclohexene chloride-1 was obtained by purifying the starting materials of Example I. Forty g. of this material was dissolved in 100 cc. of ether in a polyethylene flask connected through polyethylene tubing to an anhydrous hydrogen fluoride cylinder. The hydrogen fluoride was slowly bled into the ether solution and it was found that the hydrogen fluoride was readily absorbed. During a period of 1½ hours, 60 grams of hydrogen fluoride was absorbed and the product was isolated by pouring the ether solution into a sodium carbonate solution to neutralize the HF present and the product was then distilled. The 1-fluoro 1-chloro cyclohexane boiled at 141–2° C. at 730 mm. and was a colorless liquid. The yield was 45 grams or 96%.

*Example III*

Thirty grams of 1-fluoro 1-chloro cyclohexane produced in accordance with Example II was mixed with 1.5 g. of powered cobalt naphthionate in a three necked flask provided with a reflux condenser, thermometer and an inlet tube to introduce air. The solution was brought to boiling and dried air was slowly bled into the flask. After 20 minutes, a controlled evolution of hydrogen chloride started. The solution was let to cool to 110° C. and maintained at this temperature until at least the evolution of hydrogen chloride had substantially stopped. The solution was then diluted with ether, filtered from the insolubles and washed with water and sodium bicarbonate solution. The solution was then distilled and cyclohexene fluoride-1, boiling at 96–7° C. 730 mm. pressure was obtained. The yield was 13 grams or 59.2%.

We claim:

The process for the preparation of cyclohexene fluoride-1 comprising reacting 1-fluoro 1-chloro cyclohexane with cobalt naphthionate by bringing said reactants into contact with one another and heating, withdrawing hydrogen chloride from said reaction mixture and recovering therefrom cyclohexene fluoride-1.

References Cited in the file of this patent
UNITED STATES PATENTS
2,533,133    McBee et al. _____ Dec. 5, 1950

OTHER REFERENCES
Cuthbertson et al.: "Jour. Applied Chemistry" (London), vol. 7, (1957), p. 99–104.